United States Patent
Zeira et al.

(10) Patent No.: US 7,254,632 B2
(45) Date of Patent: Aug. 7, 2007

(54) APPARATUS AND METHOD FOR PATTERN MATCHING IN TEXT BASED PROTOCOL

(75) Inventors: Assaf Zeira, Shoham (IL); Elyahou Kamhine, Givat Shmuel (IL)

(73) Assignee: P-Cube Ltd., Hertzlia (IL)

( * ) Notice: Subject to any disclaimer, the term of this patent is extended or adjusted under 35 U.S.C. 154(b) by 804 days.

(21) Appl. No.: 10/132,296

(22) Filed: Apr. 26, 2002

(65) Prior Publication Data

US 2003/0204584 A1 Oct. 30, 2003

(51) Int. Cl.
*G06F 15/173* (2006.01)

(52) U.S. Cl. .................... 709/224; 709/223; 707/6

(58) Field of Classification Search ........ 709/223–224, 709/5, 212–216; 707/6
See application file for complete search history.

(56) References Cited

U.S. PATENT DOCUMENTS

| | | | |
|---|---|---|---|
| 4,414,644 A | 11/1983 | Tayler | |
| 4,550,436 A | 10/1985 | Freeman et al. | |
| 4,616,359 A | 10/1986 | Fontenot | |
| 4,788,656 A | 11/1988 | Sternberger | |
| 5,042,029 A | 8/1991 | Hayakawa | |
| 5,050,162 A | 9/1991 | Golestani | |
| 5,067,127 A | 11/1991 | Ochiai | |
| 5,090,011 A | 2/1992 | Fukuta et al. | |
| 5,167,033 A | 11/1992 | Bryant et al. | |
| 5,193,151 A | 3/1993 | Jain | |
| 5,317,509 A | 5/1994 | Caldwell | |
| 5,400,329 A | 3/1995 | Tokura et al. | |
| 5,414,650 A * | 5/1995 | Hekhuis | 708/203 |
| 5,414,704 A | 5/1995 | Spinney | |
| 5,444,706 A | 8/1995 | Osaki | |
| 5,463,620 A | 10/1995 | Sriram | |
| 5,463,777 A | 10/1995 | Balkowski et al. | |
| 5,473,604 A | 12/1995 | Lorenz et al. | |
| 5,574,910 A | 11/1996 | Balkowski et al. | |
| 5,617,421 A | 4/1997 | Chin et al. | |
| 5,646,943 A | 7/1997 | Elwalid | |
| 5,650,993 A | 7/1997 | Lakshman et al. | |
| 5,673,263 A | 9/1997 | Basso et al. | |
| 5,715,250 A | 2/1998 | Watanabe | |
| 5,742,239 A | 4/1998 | Siloti | |
| 5,745,488 A | 4/1998 | Thompson et al. | |
| 5,757,770 A | 5/1998 | Lagoutte et al. | |

(Continued)

OTHER PUBLICATIONS

T.V. Lakshman, et al, High-speed policy-based packet forwarding using efficient multi-dimensional range matching, 1998, ACM SIGCOMM Computer Communication Review, vol. 28, No. 4, pp. 203-214.

(Continued)

*Primary Examiner*—Saleh Najjar
*Assistant Examiner*—Faruk Hamza
(74) *Attorney, Agent, or Firm*—Abelman, Frayne & Schwab

(57) ABSTRACT

A search engine for matching textual patterns in a traffic stream. The search engine comprises a traffic control unit, a micro-code memory, a comparator and a report memory. The traffic control unit is capable of managing the traffic stream. The micro-code memory is capable of storing and retrieving micro-code instructions. The comparator is capable of executing said micro-code instructions to match the textual patterns. The report memory is capable of storing and retrieving reports generated said comparator.

50 Claims, 7 Drawing Sheets

U.S. PATENT DOCUMENTS

Figure 1:
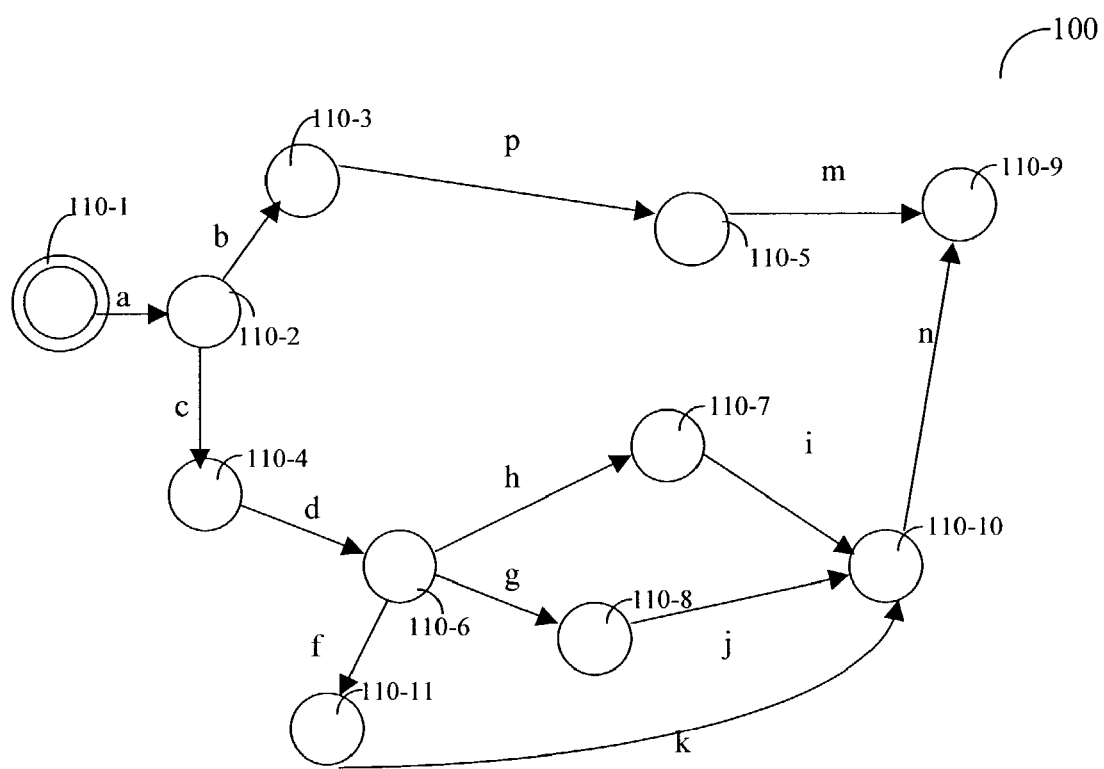

| | | | |
|---|---|---|---|
| 5,761,640 A | 6/1998 | Kalyanswamy et al. | |
| 5,764,641 A | 6/1998 | Lin | |
| 5,781,545 A | 7/1998 | Matthew | |
| 5,796,942 A * | 8/1998 | Esbensen | 726/13 |
| 5,805,577 A | 9/1998 | Jain et al. | |
| 5,806,086 A | 9/1998 | Kimmel et al. | |
| 5,815,500 A | 9/1998 | Murono | |
| 5,842,040 A | 11/1998 | Hughes et al. | |
| 5,898,837 A | 4/1999 | Guttman et al. | |
| 5,901,138 A | 5/1999 | Bader et al. | |
| 5,936,939 A | 8/1999 | Des Jardins et al. | |
| 5,936,940 A | 8/1999 | Marin et al. | |
| 5,946,302 A | 8/1999 | Waclawsky | |
| 5,956,721 A | 9/1999 | Douceur et al. | |
| 5,995,488 A | 11/1999 | Kalkunte et al. | |
| 5,995,971 A | 11/1999 | Douceur et al. | |
| 6,032,190 A | 2/2000 | Bremer et al. | |
| 6,041,054 A | 3/2000 | Westberg | |
| 6,052,683 A | 4/2000 | Irwin | |
| 6,075,769 A | 6/2000 | Ghanwani et al. | |
| 6,104,696 A | 8/2000 | Kadambi et al. | |
| 6,111,874 A | 8/2000 | Kerstein | |
| 6,157,617 A | 12/2000 | Brandin et al. | |
| 6,161,144 A | 12/2000 | Michels et al. | |
| 6,167,047 A | 12/2000 | Welfeld | |
| 6,185,208 B1 | 2/2001 | Liao | |
| 6,185,568 B1 | 2/2001 | Douceur et al. | |
| 6,266,664 B1 | 7/2001 | Russell-Falla et al. | |
| 6,275,861 B1 | 8/2001 | Chaudri et al. | |
| 6,292,489 B1 | 9/2001 | Fukushima et al. | |
| 6,295,532 B1 | 9/2001 | Hawkinson | |
| 6,298,340 B1 | 10/2001 | Calvignac et al. | |
| 6,393,587 B2 * | 5/2002 | Bucher et al. | 714/39 |
| 6,404,752 B1 | 6/2002 | Allen et al. | |
| 6,434,153 B1 | 8/2002 | Yazaki et al. | |
| 6,460,120 B1 | 10/2002 | Bass et al. | |
| 6,463,068 B1 | 10/2002 | Lin et al. | |
| 6,535,482 B1 | 3/2003 | Hadi Salim et al. | |
| 6,542,466 B1 | 4/2003 | Pashtan et al. | |
| 6,542,508 B1 | 4/2003 | Lin | |
| 6,590,894 B1 | 7/2003 | Kerr et al. | |
| 6,608,816 B1 | 8/2003 | Nichols | |
| 6,628,610 B1 | 9/2003 | Waclawsky et al. | |
| 6,631,466 B1 * | 10/2003 | Chopra et al. | 712/300 |
| 6,633,540 B1 | 10/2003 | Raisanen et al. | |
| 6,633,920 B1 | 10/2003 | Bass et al. | |
| 6,647,424 B1 | 11/2003 | Pearson et al. | |
| 6,652,694 B1 * | 11/2003 | Nonaka et al. | 156/182 |
| 6,654,374 B1 | 11/2003 | Fawaz et al. | |
| 6,657,962 B1 | 12/2003 | Barri et al. | |
| 6,665,725 B1 * | 12/2003 | Dietz et al. | 709/230 |
| 6,681,217 B1 * | 1/2004 | Lewak | 707/3 |
| 6,700,889 B1 | 3/2004 | Ben-Nun | |
| 6,704,728 B1 * | 3/2004 | Chang et al. | 707/5 |
| 6,714,517 B1 | 3/2004 | Fawaz et al. | |
| 6,788,697 B1 | 9/2004 | Aweya et al. | |
| 6,804,701 B2 * | 10/2004 | Muret et al. | 709/203 |
| 6,826,669 B1 * | 11/2004 | Le et al. | 711/173 |
| 6,842,906 B1 * | 1/2005 | Bowman-Amuah | 719/330 |
| 6,917,972 B1 * | 7/2005 | Basko et al. | 709/224 |
| 7,013,323 B1 * | 3/2006 | Thomas et al. | 709/203 |
| 2001/0016899 A1 | 8/2001 | Nei | |
| 2002/0122386 A1 | 9/2002 | Calvignal et al. | |
| 2002/0165947 A1 | 11/2002 | Akerman et al. | |

OTHER PUBLICATIONS

Rebecca Thomas, et al, A user guide to the UNIX system, 1985, Obsborne McGraw-Hill, p. 151.

http://developer.intel.com/ial/pbnm, Sep. 2001.

* cited by examiner

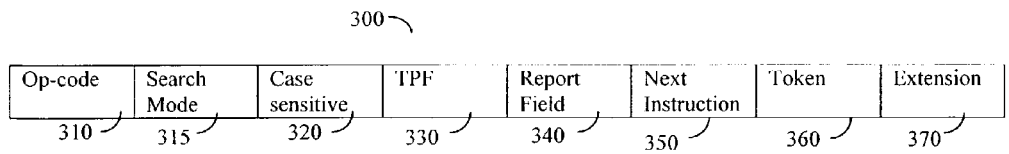

Figure 3

| Op-code Type | Description |
|---|---|
| Charset Search | Match a single byte from the traffic to the token |
| String Search | Match the token to a set of consecutive bytes from traffic |
| Multi Search | Match a single byte from the traffic to one or more tokens |
| Rang Search | Determine if a token is, a digit, a lowercase letter, or an uppercase letter |
| NOP | No matching, generate special report |

Figure 4A

| Search mood | Description |
|---|---|
| Normal Search | Scanning the traffic is sequentially |
| Skip Until | Skip until matches a given token |
| Skip Over | Skip over one or more the given token |

Figure 4B

| TPF value | Description |
|---|---|
| 00 | No not update the traffic pointer upon mismatch |
| 01 | Updates the traffic pointer upon mismatch |
| 10 | Do not update the traffic pointer on match |
| 11 | Update the traffic pointer on match |

Figure 4C

| Op-code | Mode | Case-Senc | TPF | Report | Next Instr. | Token | Extension |
|---|---|---|---|---|---|---|---|
| Charset-search | Normal | Yes | 11 | 00 | 111 | K | Not in use |

Figure 4D

Traffic Stream

GET   /p-cube.htm HTTP/1.0\r\n
      Connection: Keep-Alive\r\n
      User: Mozilla/4.7 [en] (WinNT; I)\r\n
      Host: labserver2\r\n
      Accept: image/gif, image/x-xbitmap, image/jpeg, image/pjpeg, image/png, */*\r\n
      Accept-Encoding: gzip\r\n
      Accept-Language: en,ru\r\n
      Accept-Charset: iso-8859-1,*,utf-8\r\n
      \r\n

Figure 7A

| State | Op-Code | Search Mode | Case Sensitive | Next State | | Report | | Token |
|---|---|---|---|---|---|---|---|---|
| | | | | *Match* | *Mismatch* | *Match* | *Mismatch* | |
| 710-1 | String Search | Normal | Yes | 710-2 | Terminate | Yes | No | GET |
| 710-2 | String | Skip Over | No | 710-2 | 710-3 | No | No | "White blank" |
| 710-3 | Charset Search | Skip Until | Yes | 710-4 | 710-3 | No | No | \r |
| 710-4 | Charset Search | Normal | Yes | 710-5 | Terminate | No | No | \n |
| 710-5 | Multi Search | Normal | Yes | 710-6 | Terminate | Yes | No | Host: |
| | | Normal | Yes | 710-6 | Terminate | Yes | No | User: |
| 710-6 | Charset Search | Skip Until | Yes | 710-7 | 710-6 | No | No | \r |
| 710-7 | Charset Search | Normal | Yes | 710-8 | Terminate | No | No | \n |
| 710-8 | NOP | --- | --- | --- | --- | Yes | Yes | |

Figure 7B

Extracted values

| Traffic Pointer | Length | State number | Value |
|---|---|---|---|
| 4 | 11 | 710-1 | /p-cube.htm |
| 66 | 27 | 710-5 | Mozilla/4.7 [en] (WinNT; I) |
| 103 | 10 | 710-5 | labserver2 |

APPARATUS AND METHOD FOR PATTERN MATCHING IN TEXT BASED PROTOCOL

I. DESCRIPTION

I.A. Field

The present disclosure relates generally to communication devices, and specifically to classifying information received by communications devices. More particularly, this disclosure relates to the classification of textual information transmitted over a digital computer network.

I.B. Background

1. References

The following U.S. patents and papers provide useful background information, for which they are incorporated herein by reference in their entirety.

| | | |
|---|---|---|
| 6,298,340 | October 2001 | Calvignac, et al. |
| 6,295,532 | September 2001 | Hawkinson |
| 6,275,861 | August 2001 | Chaudri, et al. |
| 6,266,664 | July 2001 | Russell-Falla, et al. |
| 6,185,568 | February 2001 | Douceur, et al. |
| 6,167,047 | December 2000 | Welfeld |
| 6,157,617 | December 2000 | Brandin, et al. |
| 6,041,053 | March 2000 | Douceur, et al. |
| 5,956,721 | September 1999 | Douceur, et al. |
| 5,761,640 | June 1998 | Kalyanswamy, et al. |
| 5,317,509 | May 1994 | Caldwell |
| 4,550,436 | October 1985 | Freeman, et al. |

Aho, Sethi and Ullman 1985. Addison Wesley. Compilers. Principles, Techniques and Tools.

2. Introduction

In communication networks, it is essential to provide fast classification of data passing through communication devices such as routers, switches, or gateways. Commonly, in digital communication networks, data is arranged in packets, cells, frames, etc. Packets contain data and classification information. Addressing and routing information as well as protocol-related information are kinds of classification information that are required for transmission of data from a source to a destination in a digital communication network.

The process of identification and classification of network traffic transactions requires parsing of traffic streams flowing through the network. Parsing is relatively easy when all protocol headers, for the protocol used in the communication, have well known fixed offsets from the beginning of a packet that is part of the communication. Conversely, classification is significantly more complex in protocols where offsets are not fixed and/or sets of values are to be determined. Clearly it is desirable to reduce the complexity of such a parsing.

Regular expressions are used in pattern matching in text-based Internet protocols. Regular expression denotes a language that is built according to a given set of rules. Such regular expressions are well known in the art. State machines are used to determine whether a given word, i.e., a sequence of one or more characters, is valid within the language. Therefore state machines can be used to determine if an arbitrary pattern appears in a stream flow. A state machine is defined based on a given regular expression. A pattern is a word in the language defined by the given regular expression.

Reference is now made to FIG. 1 where an exemplary state machine 100 is shown. State machine 100 has eleven states 110-1 through 110-11, where state 110-1 is an "initial state" and state 110-9 is an "accept state". State machine 100 checks whether a word is in the language by traversing the graph. The check begins at state 110-1, by consuming the character at the head of the stream. Progress from one state to another is made when a character consumed matches a character designating a traversal through a path. A word is considered "in the language" if the process ends at the accept state 110-9. In the example, state machine 100 checks if a word is in the language defined by the regular expression:

$$\text{``}r=a(bpm|c(d(fk|gj|hi))+n)\text{''}$$

One advantage for using a state machine for pattern matching is that the checks are done in parallel.

There are several implementations of state machine for pattern matching in text-based Internet protocols. An implementation based on hardware is the most efficient in terms of processing time. A conventional hardware implementation is based on a micro controller that includes a processor and random access memory (RAM). The RAM is used for storage of the incoming characters. The processor retrieves data from the RAM and uses the data to perform an operation that determines the next state. The processor then switches the state machine into this next state. Each state in the state machine is a thread executed by the processor. This implementation offloads the task of transaction detection from the CPU and leaves the CPU to handle the related actions. However, such conventional implementations do not provide data extraction, and cannot provide detection of fragments of a traffic stream.

Therefore it would be advantageous to implement a system that can provide an identification and classification of traffic transactions using state machines that will support data extraction and would provide transaction detection in fragments of a traffic stream. It would be further advantageous if the system could support multiple searches.

II. SUMMARY

To realize the advantages discussed above, the disclosed teachings provide a search engine for matching textual patterns in a traffic stream. The search engine comprises a traffic control unit, a micro-code memory, a comparator and a report memory. The traffic control unit is capable of managing the traffic stream. The micro-code memory is capable of storing and retrieving micro-code instructions. The comparator is capable of executing said micro-code instructions to match the textual patterns. The report memory is capable of storing and retrieving reports generated said comparator.

Specifically, the search engine is further capable of performing a search in fragments of said traffic stream.

Specifically, the textual patterns are regular expressions.

Specifically, the traffic control unit is provided control information for said managing.

Specifically, the traffic control unit is capable of tracing the traffic stream using a traffic pointer.

Specifically, the traffic pointer points to a current byte in the traffic stream.

More specifically, the control information comprises a length of the traffic stream, a first micro-code instruction to be executed and a length of the textual patterns to be matched.

Specifically, the micro-code memory is one of a random access memory (RAM), a flash memory and a cache memory.

Specifically, the report memory is implemented as first in first out (FIFO) memory.

Specifically the report memory is one of a RAM memory, a flash memory and a cache memory.

Specifically, the micro-code instruction comprises fields for op-code, search-mode, case sensitivity, traffic pointer flag (TPF), report, next instruction, and token.

More specifically, the op-code field includes an op-code that indicates a type of search to be performed by the search engine.

More specifically, the type of search includes at least one of a charset search, string search, multi-search, range search, and no-operation (NOP).

More specifically, the charset search op-code is used for matching a single byte from the traffic stream to contents of the token field.

More specifically, the string search op-code is used for matching a set of consecutive bytes from the traffic stream to contents of the token field.

More specifically, the range search op-code is used for determining if contents of the incoming data field is within a defined range of characters.

More specifically, the multi search op-code is used for matching at least a single byte from the traffic stream to at least two tokens.

More specifically, NOP op-code is used for generating reports.

More specifically, the search mode field includes at least a search mode that indicates a type of search to be performed.

More specifically, the search mode is at least one of a normal search, a skip-until search, and a skip-over search.

More specifically, the normal search is used for scanning the traffic stream sequentially.

More specifically, the skip-until search is used for skipping until a match to the contents of the token field is found.

More specifically, the skip-over search is used for skipping over the contents of the token field.

More specifically, the case-sensitive field is used to distinguish between lowercase and uppercase characters.

More specifically, the TPF is used to determine whether to move the traffic pointer forward.

More specifically, the report field is used to determine whether to generate a report.

More specifically, the next instruction field comprises an index to the next instruction that is to be executed.

More specifically, the next instruction field includes at least a sub-field each for a next instruction in a case of a match, and a next instruction in a case of a mismatch.

More specifically, the token field includes a sequence of alphanumeric characters to be matched.

More specifically, the micro-code instructions include instructions for analyzing the op-code field, the search-mode field, and the case sensitive field, instructions for comparing between at least one byte from the traffic stream to contents of the token field, instructions for analyzing the TPF and the next instruction field; instructions for determining whether to generate an instruction report, and instructions for sending the instruction report to said report memory if required.

More specifically, the instruction report is generated when said comparator completes execution of the micro-code instructions.

More specifically, the instruction report includes information on at least one of a pointer to data in the traffic streams, reported instruction number and a report trigger.

More specifically, the report trigger is one of a match trigger and a mismatch trigger.

More specifically, the TPF is analyzed for determining the number of bytes to advance the traffic pointer.

Specifically, the reports is at least one of instruction report, terminate report and NOP report.

More specifically, the instruction report is generated when said comparator completes execution of said micro-code instructions.

More Specifically, the instruction report includes information on at least one of a pointer to data in said traffic, reported instruction number and report trigger.

More specifically, the report trigger is one of a match trigger and a mismatch trigger.

More specifically, the NOP report is generated when the op-code field has a NOP op-code.

More specifically, the NOP report comprises information entered by said comparator and a report trigger.

More specifically, the report trigger is a NOP trigger.

More specifically, the terminate report is generated when said comparator completes matching.

More specifically, the terminate report comprises information on at least one of the reported instruction and a report trigger.

More specifically, the report trigger is one of a match trigger, a mismatch trigger and an inconclusive trigger.

More specifically, the inconclusive match is a trigger that indicates that the traffic stream has ended before it was possible to determine whether there was a pattern match or a pattern mismatch.

Specifically, the search engine is capable of performing a search by generating a terminate report with an inconclusive trigger, if the traffic stream has ended before it was possible to determine whether there was a pattern match or mismatch; uploading the terminate report from said report memory, if said comparator receives a packet which is a continuation of the traffic stream which caused the generation of said terminate report with an inconclusive trigger; and continuing the search according to the designated instruction's parameters provided in said terminate report.

Another aspect of the disclosed teachings is a method for matching textual patterns in a traffic stream using a search engine comprising at least a traffic control unit, a micro-code memory, a comparator, and a report memory. The method comprises loading data from the traffic stream into the comparator using the traffic control unit. The micro-code instruction to be executed next is fetched from the micro-code memory and executed using the comparator. A terminate report is then generated.

Specifically, the micro-code instruction is executed using a sub-process comprising analyzing the op-code field, the search-mode field, and the case sensitive field. At least one byte from the traffic stream is compared to contents of the token field. The TPF and the next instruction field is analyzed. It is determined whether to generate an instruction report. Ff required, the instruction report is sent to the report memory.

More specifically, the instruction report is generated when said comparator completes execution of said micro-code instruction.

More specifically, the instruction report includes information on at least one of a pointer to data in the traffic streams, reported instruction number and a report trigger.

More specifically, the report trigger is one of a match trigger and a mismatch trigger.

More specifically, the terminate report is generated when said engine completes matching.

More specifically, the terminate report comprises information on at least one of the reported instruction and a report trigger.

More specifically, the report trigger is one of a match trigger, a mismatch trigger and an inconclusive trigger.

More specifically, the inconclusive match is a trigger that indicates that the traffic stream has ended before it was possible to determine whether there was a pattern match or a pattern mismatch.

More specifically, the search in fragments of traffic stream comprises generating a terminate report with an inconclusive trigger, if said traffic stream has ended before it was possible to determine whether there was a pattern match or mismatch. The terminate report is uploaded from said report memory, if said comparator receives a packet which is a continuation of the traffic stream which caused the generation of said terminate report with an inconclusive trigger. The search is continued according to the designated instruction's parameters provided in said terminate report.

Another aspect of the disclosed teachings is a micro-code instruction for matching textual patterns in a traffic stream using search engine, the micro-code instruction comprises fields for op-code, search-mode, case sensitivity, traffic pointer flag (TPF), report, next instruction, and token.

III. BRIEF DESCRIPTION OF THE DRAWINGS

The above objectives and advantages of the disclosed teachings will become more apparent by describing in detail preferred embodiments thereof with reference to the attached drawings in which:

FIG. 1—is an exemplary state machine.

Figure 2:
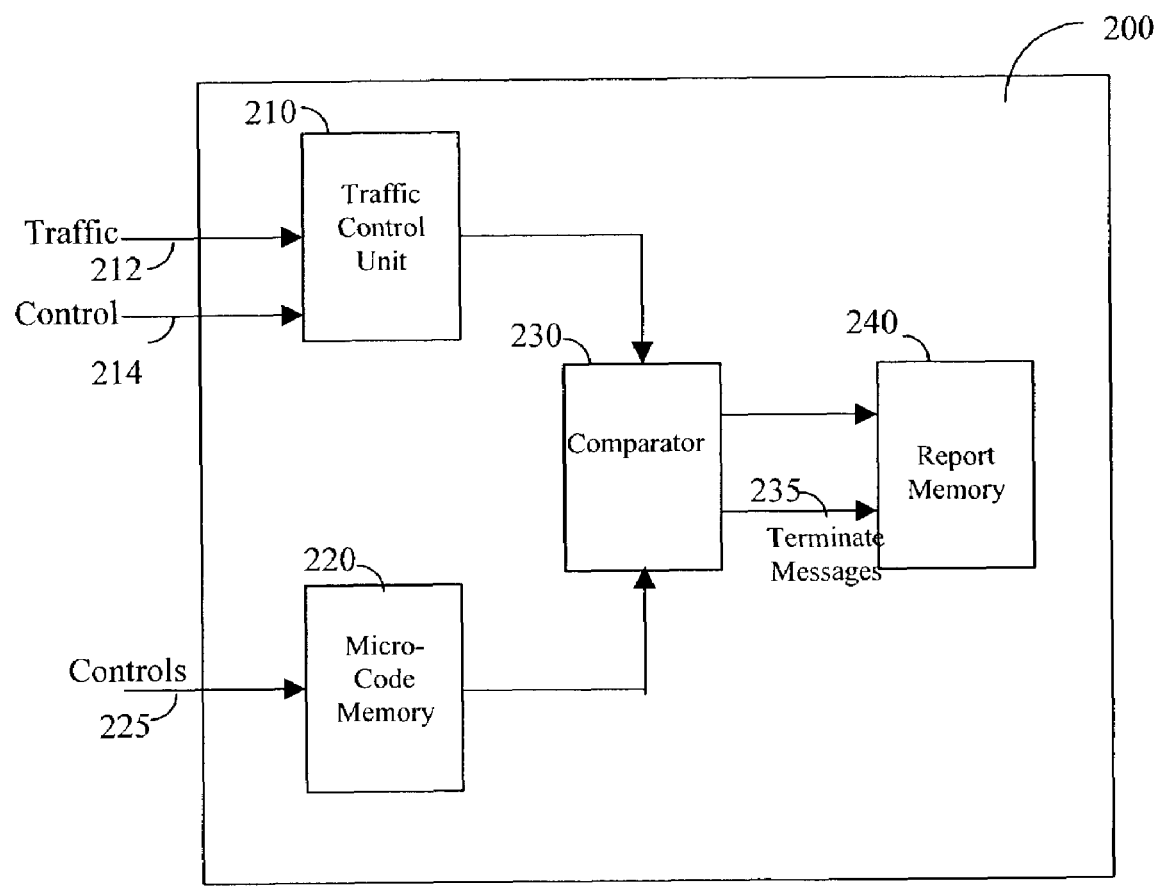

FIG. 2—is a schematic block diagram of a search engine in accordance with the disclosed teachings.

FIG. 3—is a non-limiting example to micro-code instruction structure.

FIGS. 4(A)-(D) is non-limiting op-codes sub-set.

Figure 5:
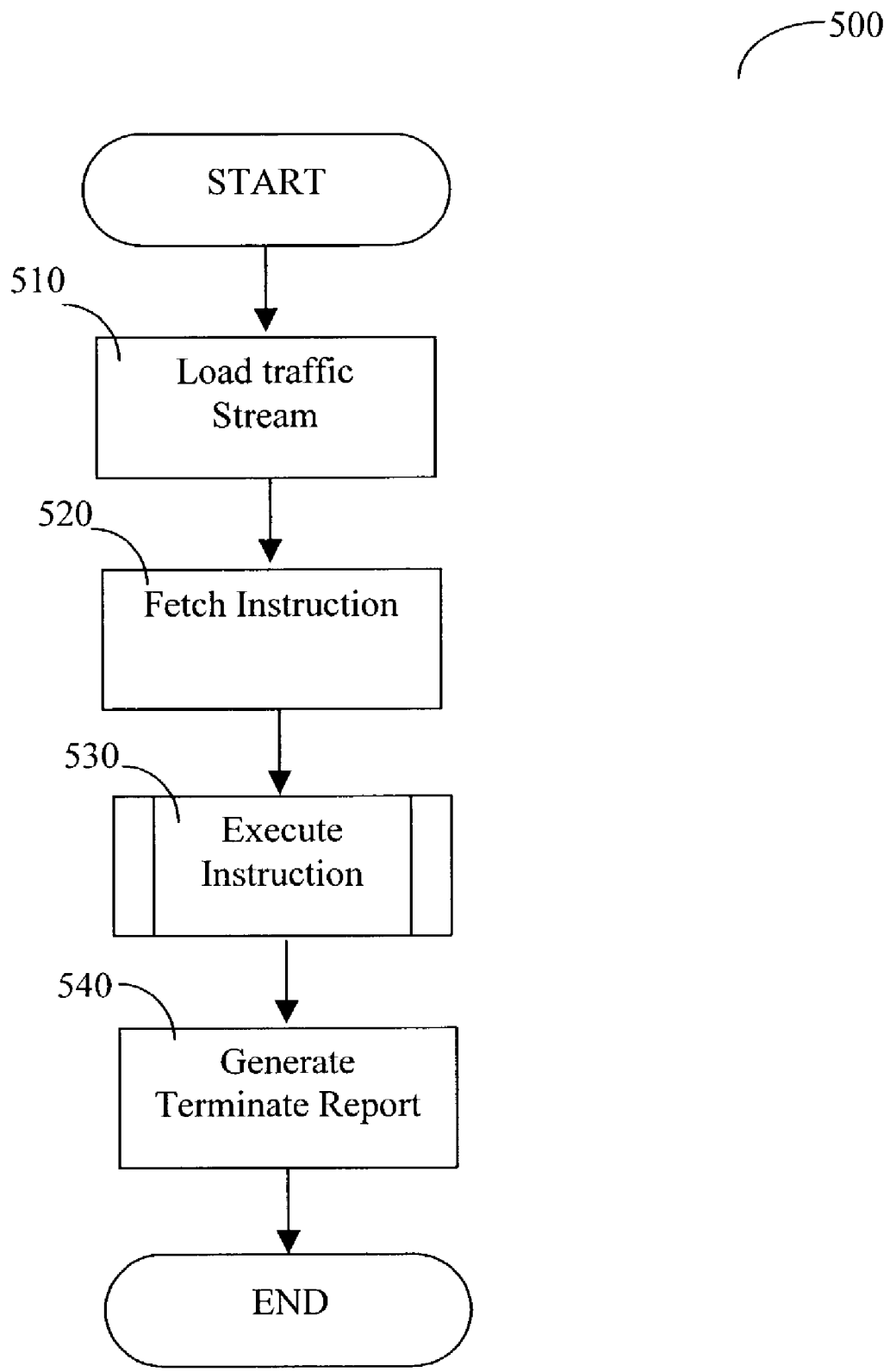

FIG. 5—is an exemplary flow chart describing the process of pattern matching.

Figure 6:
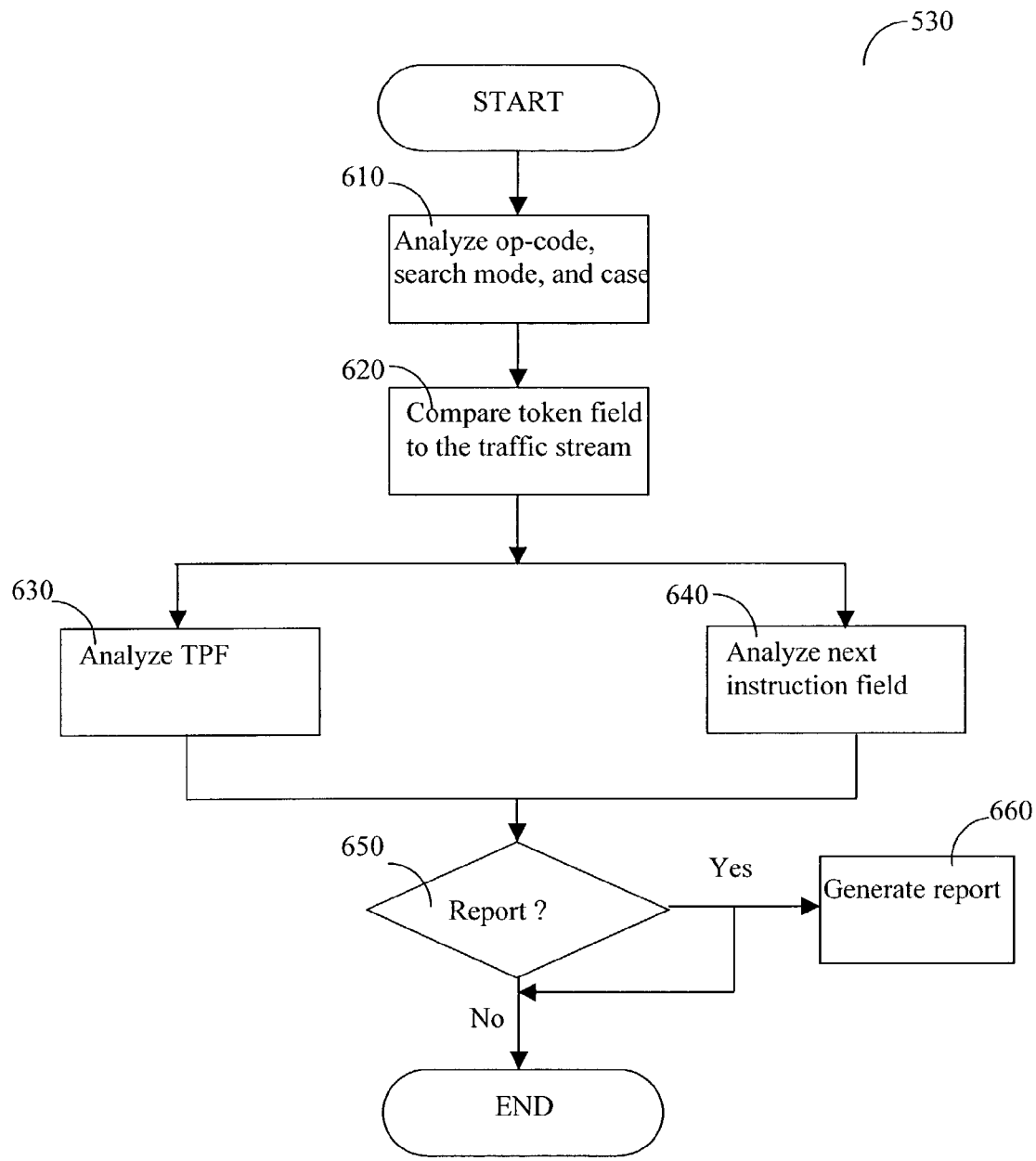

FIG. 6—is an exemplary flow chart describing the process of executing micro-code instruction.

FIGS. 7(A)-(D) depict exemplary diagrams showing the use of the state machine according to the disclosed teachings.

IV. DETAILED DESCRIPTION

This disclosure teaches a system and method enabling identification and classification of text-based traffic in a digital computer network. The disclosed techniques are realized through a regular expression search engine. The disclsoed techniques provide for a fast processing of pattern matching. Additionally, the search engine extracts data out of the traffic stream according to demand.

Reference is now made to FIG. 2 where a non-limiting exemplary block diagram of search engine 200 that implements the disclosed techniques is shown. Search engine 200 consists of traffic control unit 210, micro-code memory 220, comparator 230, and report memory 240. Traffic control unit 210, is used for managing the traffic flow 212 which is the input to the search engine 200, and for handling the current packet. Additionally, traffic control unit 210 receives control information 214. Control information 214 includes information about the incoming traffic length, the regular expression length, the first instruction to be executed and other information regarding the search.

Upon request by comparator 230, traffic control unit 210 sends bytes of data to comparator 230. Comparator 230 determines the number of bytes to be sent from traffic control unit 210. Traffic control unit 210 traces the traffic stream by using a traffic pointer, which points to the last read byte in the traffic stream. Normally a single character will reside in a single byte of data. Traffic control unit 210 changes the traffic pointer according to commands initiated by comparator 230.

Micro-code memory 220 includes the micro-code instructions that are executed by comparator 230. The set of instructions required for performing the match are loaded into micro-code memory 220 through control lines 225.

Each set of instructions is used for matching a single regular expression. Comparator 230 may have more than one instruction set. Comparator 230 manages all the activities related to matching of defined patterns to data streams as well as reporting match results. Comparator 230 reads a data segment of the traffic stream from traffic control unit 210, and fetches the next instruction from micro-code memory 220. Reports from comparator 230 are stored in report memory 240.

Report memory 240 is implemented as a first-in-first-out (FIFO) memory and includes the reported instruction number, traffic pointer value, and length of the report. Comparator 230 also provides terminate messages 235. These messages are described in detail below.

Reference is now made to FIG. 3 where a non-limiting example of a format of a micro-code instruction 300 is shown. A micro-code instruction consists of the following fields: op-code 310, search mode 315, case sensitive 320, traffic pointer flag (TPF) 330, report field 340, next instruction 350, token 360, and extension 370.

Op-code field 310 defines the type of search operation to be used. An exemplary non-limiting list of op-codes is shown in FIG. 4A. The "charset search" op-code is used to match a single byte of the network traffic 212 to a known value, or values placed as token 360. The "string search" op-code is used to match a value, placed as a token 360, to a set of consecutive bytes from traffic 212. The "multi-search" op-code is used to match a set of tokens 360 to a single byte of data from the traffic 212. The no-operation (NOP) op-code is used to indicate that no search is to be performed. Commonly, the NOP op-code is used for generating a special report, further detail below.

The "range-search" op-code is used to determine whether an incoming data is within a defined range of characters. For example, it enables the determination whether the incoming data is a digit, by having search token field 360 set to "0-9", a lowercase letter, by setting search token field 360 to "a-z", or an uppercase letter, by setting search token field 360 to "A-Z". Other ranges could be easily set to identify other operations. In order to define the type of a search performed under an op-code the search mode field 315 is used. Search mode field 315 defines the mode of searches to be used, and includes, but is not limited to, normal search, skip over, and skip until, further shown in FIG. 4B. In "normal search" mode, comparator 230 attempts to match a byte from traffic 212 to token 360 defined in the instruction, by scanning the traffic sequentially. In "skip over" mode, match is performed by skipping over a defined token that is placed in token field 360. In "skip until" mode, match is performed by skipping until a defined token is found, the token being placed in token field 360. It should be noted that the "search mode" may be possible to use only in "charset search", "range-search", and "string search" op-codes. However, any combination of these op-codes and a "search mode" may be used, for example, the op-code may be "charset search" in "normal search" mode, "charset search" in "skip until" mode, and so forth.

Case sensitive field 320 is used when it is necessary to distinguish between uppercase and lowercase characters. When 'case sensitive' is activated, comparator 230 finds only those instances in which the character case matches that of the token in token field 360.

TPF field 330 determines whether to move the traffic pointer forward in traffic control unit 210 in case of a match, or a mismatch. The options used in TPF 330 are further shown in FIG. 4C. In the case where the traffic pointer is to be updated, comparator 230 forwards the traffic pointer. The number of bytes by which the traffic pointer is to be advanced depends on the "op-code" and the "search mode" types, as well as the content of traffic 212. For example, if "multi-search" op-code is used then the traffic pointer is advanced by one byte. By comparison, in the "string match" op-code with "skip over" search mode the traffic pointer is advanced by up to four bytes, the exact number depending on traffic 212.

Report field 340 determines whether comparator 230 should generate a report. Report field 340 consists of two sub-fields: report in a case of match and report in a case of mismatch. The content of report field 340 may be, for example, "00" for no report, "01" for report on mismatch, "10" for report on match. The "next instruction" field 350 includes indexes of the next instructions to be performed in the cases of a match or a mismatch. Each sub-field for a match and mismatch may include the next instruction number, or the offset to the next instruction. In the multi-match instruction the "next instruction" 350 appears more than once as described in detail below. It is further possible for one of the fields to point back to itself hence allowing a repetitive sequence until the other condition, either a match or a mismatch occurs.

Token field 360 includes a sequence of alphanumeric characters to be matched, or other types of information, which may be required by the instruction. In one embodiment of the invention the token may include, at most, a predefined number of characters, for example, four characters. The multi-match instruction includes more than one token as described in further detail below. It should be noted that the micro-code instruction may include additional fields, depending on the type of the instruction. Such fields are described in more detail below.

Extension field 370 is used for additional information that is useful in implementing the various micro-code instructions. Extension field 370 may consist of several different fields each containing various pieces of information. Examples for such fields are mentioned below.

FIG. 4D shows a non-limiting example of the use of the method to create an instruction using a "charset search" op-code. It is used for comparing a single byte of traffic 212 to a token 360. In "charset match" micro-code instruction token field 360 may include more than one character. In executing this instruction, comparator 230 compares a single byte from traffic 212 to the content of token field 360. For example, if token field 360 contains a "K" character, and traffic 212 is "K", then comparator 230 will return a match message. If token field 360 includes more than one character, than comparator 230 tries to match the characters in token 360 to a single byte from traffic 212. For example, if token field 360 includes the three characters "LKM" and traffic 212 is "K" comparator 230 will return a match message. In a case where traffic 212 is "k", comparator 230 will return a mismatch message. The comparison is performed in accordance with the content of search mode field 315 and case sensitive field 320.

When using the "charset match" instruction, comparator 230 may return two messages: match or mismatch, as the case may be. Similarly, a "string match" instruction is defined by the "string search" op-code. When this instruction provided to comparator 230, it enables the comparison of consecutive bytes of traffic stream 212 to a string defined in token field 360. For example, if token 360 includes four characters and its content is "XY5Z", and traffic 212 is "XY5Z" comparator 230 will return a match message. In a case where traffic 212 is "cZYX" or "XbYc" comparator 230 will return a mismatch message.

The string match instruction format includes an additional field "string length", which determines the length of the string to be matched. The string length field is part of extension field 370 defined in the micro-code instruction format. The string length content determines the number of bytes of traffic 212 to be matched. In order to perform the comparison the number of bytes from traffic 212 must be equal to number of bytes in token field.

The "multi-match" instruction is defined by the "multi match" op-code, and provides the capability of comparison of bytes from the traffic to different tokens. The "multi match" instruction format includes, in addition to the fields described in FIG. 3, the following fields: the number of tokens to be matched (hereinafter "N"), N "token" fields, N+1 "next instruction" fields, N "report flag" fields, and the number of tokens to be matched. Those fields are part of extension field 370. There are N "next instruction" one for each token match, one "next instruction" field includes information about the next instruction in the case where none of the N tokens were matched.

The additional N "report flag" fields provide the system the ability to generate a report, in a case of match or mismatch, for each compared token. In one embodiment of embodying the disclosed techniques, the number of token to be matched (i.e. "N") is limited to a maximum number, for example to be at most six tokens. When executing the "multi-match" instruction, comparator 230 reports mismatch if none of the possibilities were matched. In all of the instructions described above, comparator 230 advances the traffic pointer, fetches the next instruction according to the content in TPF 330 and next instruction 350 fields. Moreover, comparator 230 generates reports based on the content of the report field 340.

A report is used to extract data from traffic stream 212. The extraction of data is done by pointing to data position at traffic stream 212. Such a report includes the traffic pointer value at the beginning of the data, the pointer value at the end of the data, the instruction number, and the trigger for the report. A report trigger may be a match or a mismatch. It should be noted that despite the fact that each one of the mach micro-code instructions compares a token with a limited number of bytes to traffic 212, comparator 230 may compare an unlimited number of bytes to traffic 212. In order to perform such a comparison, search engine 200 provides the ability to link unlimited number of micro-code instructions.

NOP instruction is used for generating special reports. Such special reports are created by placing information defined by the user in the micro-code instruction. On demand, this information is copied to report memory 240. The information is placed at a user-defined field, which is part of extension field 370. The special report includes the report instruction, the required information, and the trigger for that report. In that case the trigger should be a NOP trigger.

It should be noted that a person skilled in the art could easily add new micro-code instructions by adding new op-codes, search modes, or any other relevant parameter. Furthermore, a person skilled in the art could easily change the micro-code instruction format, by adding new fields to the instruction or by changing the length of each field.

Reference is now made to FIG. 5 where exemplary flow chart 500 for pattern matching in accordance with the disclosed teachings is shown. In step 510, comparator 230 loads the data from traffic control unit 210. In step 520, comparator 230 fetches the next instruction to be executed, and as explained above, each instruction includes the parameters needed for matching or reporting. In step 530, comparator 230 executes the instruction by, among other things, checking the various comparison options based on op-code 310, search mode 315, case sensitive 320, token 360 and other parameters defined in the instruction.

Step 530 is further detailed in FIG. 6. When the match process of step 530 is complete or terminated, the comparator 230 generates a return message 235 in step 540 according to the match result. The terminate messages may be "match", "mismatch", or "inconclusive match". The terminate messages are written as a terminate report that include the last performed instruction number, and the trigger that has caused the termination to occur. The trigger may be "terminate on match", "terminate on mismatch", or "terminate on inconclusive match".

"Inconclusive match" message indicates that the traffic stream ended before it was possible to determine whether there was a pattern match or mismatch. The inconclusive match provides the ability to match tokens to fragments of a traffic stream. In a case of an inconclusive match comparator 230 returns the "inconclusive match" message. Additionally, comparator 230 stores the current instruction number and the traffic pointer value in report memory 240. When traffic control unit 210 receives an additional packet, or packets, belonging to the designated traffic steam 212, comparator 230 uploads the match parameters from report memory 240 and continues the matching process.

Reference is now made to FIG. 6 where a non-limiting exemplary flowchart 530 for executing a micro-code instruction of the invention disclosed, is shown. In step 610, comparator 230 parses op-code field 310, search mode field 315, and case sensitive field 320 and according to these fields' content matches token 360 with traffic 212. In the case where the executed instruction is a NOP instruction, comparator 230 does not perform a match operation. In step 620 comparator 230 compares token 360 to part of the traffic stream. The comparison is done in accordance with the definitions in the "op code", "search-mode", and "case sensitive" fields. In step 630, comparator 230 parses TPF field 330 and according to the field's content notifies traffic control unit 210 whether to advance the traffic pointer. If traffic pointer should be advanced, comparator 230 specifies the number of bytes to forward the traffic pointer. In step 640 comparator 230 analyzes the next instruction field according to the match result. The next instruction to be fetched in a case of match or a mismatch is then determined.

It should be noted that the next instruction may be the currently executing instruction. For example, in the case where the instruction includes the "skip over" search mode, comparator 230 does not fetch a new instruction but rather repeats the same instruction until the match is found or no traffic is available. Steps 630 and 640 are executed in parallel.

In step 650, comparator 230 based on report field 340, determines whether to generate a report. In the case where a report should be generated, then in step 660 comparator 230 passes the instruction number, the traffic pointer value, and the report trigger to report memory 240.

Reference is now made to FIG. 7 where a non-limiting example for pattern matching is shown. In the example comparator 230 attempts to match the pattern:

GEI % *\r\n(Host: % \r\nlUser: % r\\n).

Figures 7C, 7D:
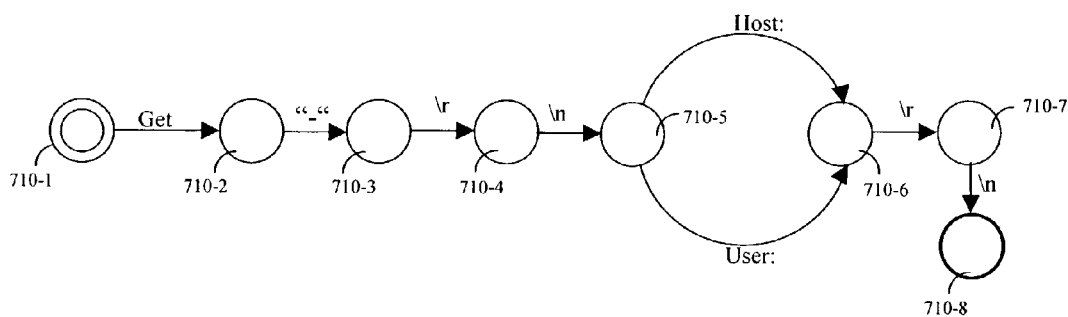

The pattern is matched to the traffic stream shown in FIG. 7A. The match is preformed using the micro-code instructions shown in FIG. 7B. These micro-code instructions would result in state machine 700 illustrated in FIG. 7C. The extract values from the traffic stream is shown in FIG. 7D.

In the example, state machine 700 consists of nodes 710-1 through 710-8, each representing a micro-code instruction. Each edge between the nodes represents a token to be matched. In state 710-1 the "GET" token is matched. The instruction used in state 710-1 is the "string match" instruction. In state 710-2, comparator 230 attempts to match blank or "space" characters, the search mode define in the instruction is "skip over" mode. Therefore, comparator 230 does not step forward from state 710-2 until matching a character different from the space character. This is done in order to skip over one or more blank characters that may appear at the traffic stream. In states 710-3, and 710-4 comparator 230 identifies the characters for new line (e.g."\r\n"). First, comparator 230 in state 710-3 attempts to match the character "\r", in the case of mismatch comparator 230 stays at state 710-3, until matching "\r". The next character coming after "\r" must be "\n" therefore the instruction at state 710-4 uses the "normal search mode". The instruction used in state 710-5 is the "multi-match" instruction, therefore, state 710-5 includes two tokens to be matched "Host:" and "User:" In case of match comparator 230 branches to state 710-6, else the process is terminated. The matching process is ended at state 710-8, which represents a NOP instruction. State 710-8 generates the terminate message, in this example the terminate message would be "match". States 710-1 and 710-5 should report in a case of match, therefore, comparator 230 generates a report in each state. The report includes the position within the traffic length of the data that have been extracted. The reports can be seen in FIG. 7D.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A search engine for matching textual patterns in a traffic stream, the search engine comprising:

a traffic control unit capable of managing the traffic stream comprising a sequence of data packets;

a microcode memory capable of storing and retrieving microcode instructions corresponding to a textual pattern;

a comparator capable of executing said micro-code instructions to match the textual pattern to a data sequence beginning in a first packet of said traffic stream and ending in a second packet subsequent to the first packet in said traffic stream; and a report memory capable of storing and retrieving reports generated by said comparator responsively to a result of matching said textual pattern to said data sequence, wherein the comparator is arranged to generate and save in the report memory at least one of a current instruction number and a traffic pointer value after matching a part of the textual pattern in the first packet, and to retrieve the at least one of the current instruction number and the traffic pointer value in order to continue matching the textual pattern in the second packet.

2. The search engine of claim 1, wherein said textual pattern comprises a regular expression.

3. The search engine of claim 1, wherein said microcode memory comprises a random access memory (RAM), a flash memory or a cache memory.

4. The search engine of claim 1, wherein said report memory comprises a RAM memory, a flash memory, a first in first out (FIFO) memory or a cache memory.

5. The search engine of claim 1, wherein said microcode instructions comprise an op-code field that indicates a type of search to be performed by the search engine, a search-mode field, a case sensitivity field, a traffic pointer flag (TPF), a report field, a next instruction field, and a token field.

6. The search engine of claim 5, wherein the type of search comprises a charset search, a string search, a multi-search, a range search or a no-operation (NOP).

7. The search engine of claim 6, wherein the comparator is arranged to match a single byte from the traffic stream to contents of the token field responsively to the charset search op-code.

8. The search engine of claim 6, wherein the comparator is arranged to match a set of consecutive bytes from the traffic stream to content of the token field responsively to the string search op-code.

9. The search engine of claim 6, wherein the comparator is arranged to determine if contents of the incoming data field is within a defined range of characters responsively to the charset search op-code.

10. The search engine of claim 6, wherein the comparator is arranged to match at least a single byte from the traffic stream to at least two tokens responsively to the multi-search search op-code.

11. The search engine of claim 5, wherein the search mode field specifies a normal search, a skip-until search or a skip-over search.

12. The search engine of claim 11, wherein the comparator is arranged to scan the traffic stream sequentially when the search mode field specifies the normal search.

13. The search engine of claim 11, wherein the comparator is arranged to skip until a match to contents of the token field is found when the search mode field specifies the skip-until search.

14. The search engine of claim 11, wherein the comparator is arranged to skip over contents of the token field when the search mode field specifies the skip-over search.

15. The search engine of claim 5, wherein the comparator is arranged to distinguish between lowercase and uppercase characters responsively to the case-sensitivity field.

16. The search engine of claim 5, wherein the comparator is arranged to determine whether to move the traffic pointer value forward responsively to the TPF field.

17. The search engine of claim 5, wherein the next instruction field includes at least a sub-field each for a next instruction in a case of a match, and a next instruction in a case of a mismatch.

18. The search engine of claim 5, wherein the token field includes a sequence of alphanumeric characters to be matched.

19. The search engine of claim 5, wherein the micro-code instructions include instructions for analyzing the op-code field, the search-mode field, and the case sensitive field, instructions for comparing between at least one byte from the traffic stream to contents of the token field, instructions for analyzing the TPF and the next instruction field; instructions for determining whether to generate an instruction report, and instructions for sending the instruction report to said report memory if required.

20. The search engine of claim 19, wherein the instruction report includes information on a pointer to data in the traffic stream, a reported instruction number or a report trigger.

21. The search engine of claim 20, wherein said report trigger comprises a match trigger or a mismatch trigger.

22. The search engine of claim 19, wherein the comparator is arranged to analyze the TPF field for determining a number of bytes by which to advance the traffic pointer value.

23. The search engine of claim 1, wherein said reports comprise an instruction report, a terminate report or a NOP report.

24. The search engine of claim 23, wherein said instruction report includes information on a pointer to data in said traffic, a reported instruction number or a report trigger.

25. The search engine of claim 24, wherein said report trigger comprises a match trigger or a mismatch trigger.

26. The search engine of claim 23, wherein said terminate report comprises information on the reported instruction or a report trigger.

27. The search engine of claim 26, wherein said report trigger comprises a match trigger, a mismatch trigger or an inconclusive trigger that indicates that the first packet has ended before a completion of executing said micro-code instructions by the comparator.

28. A method for matching textual patterns, comprising:
   accepting a traffic stream comprising a sequence of data packets;
   using a comparator, executing microcode instructions stored in a micro-code memory, said instructions corresponding to a textual pattern, so as to match said textual pattern to a data sequence beginning in a first packet of said traffic stream and ending in a second packet subsequent to said first packet in said traffic stream; and
   generating a report responsively to a result of matching said data sequence to said textual pattern and storing said report in a report memory; and
   generating and saving in the report memory at least one of a current instruction number and a traffic pointer value after matching a part of the textual pattern in the first packet, and retrieving the at least one of the current instruction number and the traffic pointer value in order to continue matching the textual pattern in the second packet.

29. The method of claim 28, wherein the textual pattern is a regular expression.

30. The method of claim 28, wherein said micro-code memory comprises a random access memory (RAM), a flash memory or a cache memory.

31. The method of claim 28, wherein said report memory is implemented as a first in first out (FIFO) memory.

32. The method of claim 28, wherein the micro-code instructions comprise an op-code field indicating a type of search to be performed by the search engine, a search-mode field, a case sensitivity field, a traffic pointer flag (TPF), a report field, a next instruction field, and a token field.

33. The method of claim 32, wherein the type of search comprises a charset search, a string search, a multi-search, a range search or a no-operation (NOP).

34. The method of claim 33, wherein the charset search op-code is used for matching a single byte from the traffic stream to contents of the token field.

35. The method of claim 33, wherein the string search op-code is used for matching a set of consecutive bytes from the traffic stream to contents of the token field.

36. The method of claim 33, wherein the range search op-code is used for determining if contents of the data sequence is within a defined range of characters.

37. The method of claim 33, wherein the multi search op-code is used for matching at least a single byte from the traffic stream to at least two tokens.

38. The method of claim 32, wherein the search mode field specifies a normal search, a skip-until search or a skip-over search.

39. The method of claim 38, wherein said normal search is used for scanning said traffic stream sequentially.

40. The method of claim 38, wherein said skip-until search is used for skipping until a match to contents of said token field is found.

41. The method of claim 38, wherein said skip-over search is used for skipping over contents of the token field.

42. The method of claim 32, wherein said case-sensitive field is used to distinguish between lowercase and uppercase characters.

43. The method of claim 32, wherein said next instruction field includes at least a sub-field each for a next instruction in a case of match and a next instruction in a case of mismatch.

44. The method of claim 32, wherein the token field includes a sequence of alphanumeric characters to be matched.

45. The method of claim 32, wherein a micro-code instruction is executed using a sub-process comprising:
   i) analyzing the op-code field, the search-mode field, and the case sensitive field;
   ii) comparing between at least one byte from the traffic stream to contents of the token field;
   iii) analyzing the TPF and the next instruction field;
   iv) determining whether to generate an instruction report; and
   v) if required, sending said instruction report to said report memory.

46. The method of claim 45, wherein said instruction report includes information on a pointer to data in the traffic streams, a reported instruction number or a report trigger.

47. The method of claim 46, wherein said report trigger comprises a match trigger or a mismatch trigger.

48. The method of claim 28, wherein said report comprises information on a reported instruction or a report trigger.

49. The method of claim 48, wherein said report trigger comprises a match trigger, a mismatch trigger or an inconclusive match trigger indicating that the first packet has ended before a completion of executing said micro-code instructions.

50. A program product for matching textual patterns in a traffic stream that includes a sequence of data packets, said product comprising a memory in which micro-code instructions are stored, which instructions, when executed by a processor, cause said processor to match a textual pattern to a data sequence beginning in a first packet of said traffic stream and ending in a second packet subsequent to the first packet in said traffic stream, to generate a report responsively to a result of matching said data sequence to said textual pattern, to generate and save at least one of a current instruction number and a traffic pointer value after matching a part of the textual pattern in the first packet, and to retrieve the at least one of the current instruction number and the traffic pointer value in order to continue matching the textual pattern in the second packet.

* * * * *